(12) United States Patent
Braceras et al.

(10) Patent No.: US 6,501,293 B2
(45) Date of Patent: *Dec. 31, 2002

(54) METHOD AND APPARATUS FOR PROGRAMMABLE ACTIVE TERMINATION OF INPUT/OUTPUT DEVICES

(75) Inventors: George M. Braceras, Essex Junction, VT (US); John Connor, Burlington, VT (US); Patrick R. Hansen, Essex Junction, VT (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/439,787

(22) Filed: Nov. 12, 1999

(65) Prior Publication Data

US 2002/0005734 A1 Jan. 17, 2002

(51) Int. Cl.$^7$ .............................................. H03K 19/003
(52) U.S. Cl. .......................... 326/30; 326/56; 326/57; 326/58; 326/83
(58) Field of Search ......................... 326/30, 56, 57, 326/58, 59, 83

(56) References Cited

U.S. PATENT DOCUMENTS

| | | | | |
|---|---|---|---|---|
| 4,638,187 A | * | 1/1987 | Boler et al. ................. 326/27 |
| 4,988,888 A | * | 1/1991 | Hirose et al. ................ 326/27 |
| 5,036,222 A | * | 7/1991 | Davis ......................... 326/27 |
| 5,038,056 A | * | 8/1991 | Koide et al. .................. 326/27 |
| 5,107,142 A | * | 4/1992 | Bhamidipaty ................. 326/56 |
| 5,164,663 A | | 11/1992 | Alcorn ........................ 326/30 |
| 5,227,677 A | | 7/1993 | Furman ....................... 326/30 |
| 5,243,229 A | | 9/1993 | Gabara et al. ................ 307/98 |
| 5,347,177 A | | 9/1994 | Lipp .......................... 326/30 |
| 5,391,939 A | * | 2/1995 | Nonaka ....................... 326/83 |
| 5,418,475 A | | 5/1995 | Otaka ......................... 326/30 |
| 5,530,377 A | * | 6/1996 | Walls .......................... 326/30 |
| 5,576,635 A | * | 11/1996 | Partovi et al. ................ 326/27 |
| 5,633,603 A | * | 5/1997 | Lee ............................ 326/83 |
| 5,729,152 A | | 3/1998 | Leung et al. ................. 326/30 |
| 5,841,702 A | * | 11/1998 | Kim ....................... 365/189.05 |
| 6,137,317 A | * | 10/2000 | Griffin ........................ 326/87 |

OTHER PUBLICATIONS

Pricer, "Active Terminators for CMOS Drivers", IBM Technical Disclosure Bulletin, vol. 32, No. 4A, 09/89, pp. 393–395.

* cited by examiner

Primary Examiner—Michael G. Lee
Assistant Examiner—Steven S. Paik
(74) Attorney, Agent, or Firm—Richard A. Henkler

(57) ABSTRACT

A method and apparatus for providing programmable active termination of transmission lines with substantially reduced DC power consumption.

2 Claims, 10 Drawing Sheets

METHOD AND APPARATUS FOR PROGRAMMABLE ACTIVE TERMINATION OF INPUT/OUTPUT DEVICES

BACKGROUND

1. Technical Field of the Present Invention

The present invention generally relates to programmable active terminations, and more specifically to programmable active terminations of Input/Output devices.

2. Background of the Present Invention

The electronic industry is in a state of evolution spurred by the recent changes in technology which have allowed greater functionality in smaller devices. This has resulted in the explosion of new found uses for such small devices (e.g. medical, monitoring etc.), as well as greater functionality in increasingly smaller electronic devices.

The evolution has caused electronic devices to become an inseparable part of our society. Consumers are now buying and demanding electronic devices which are smaller, more powerful, and faster at unprecedented rates. These demands are constantly driving the electronic industry to exceed limitations which were previously considered unsurpassable.

One such area ripe for improvement is how various electronic devices communicate with one another. For example, the communication between the memory and cpu of a computer. This communication is accomplished using a system data bus. The primary concerns of this type of communication are signal propagation delay and capacitive loading. Propagation delay is minimized by placing the memory as close to the cpu as possible. Capacitive loading is minimized by using point-to-point networks. As the speed of the system data bus approaches one Giga Hertz and beyond, the data transfers must be point-to-point terminated. The point-to-point termination is accomplished by terminating each signal trace to a reference voltage via the use of resistors ("terminating resistors").

The implementation of the point-to-point termination while minimizing signal propagation delay and capacitive loading has resulted in requiring the terminating resistors to reside on the chip itself ("on-chip"). Since the termination resistors are critical to both the timing and integrity of transmitted signals, they must be highly accurate (i.e. resistance values will not vary when exposed to changes in process and/or temperature). Unfortunately, the terminating resistors also require a considerable amount of space and consume a significant amount of Direct Current (DC) power.

It would therefore be a distinct advantage to have a method and apparatus for providing on-chip termination resistance that would be highly accurate, occupy less space, and consume less DC current than current terminating resistors. The present invention provides such a method and apparatus.

SUMMARY OF THE PRESENT INVENTION

The present invention is a method and apparatus for providing programmable active termination of transmission lines.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

In the following description, numerous specific details are set forth, however, it will be obvious to those of ordinary skill in the art that the present invention can be practiced with different details. In other instances, well-know circuits have been shown in block diagram form in order not to obscure the present invention in unnecessary detail. For the most part, details concerning timing considerations and the like have been omitted inasmuch as such details are not necessary to obtain a complete understanding of the present invention, and are within the skills of persons of ordinary skill in the relevant art.

Figure 1:
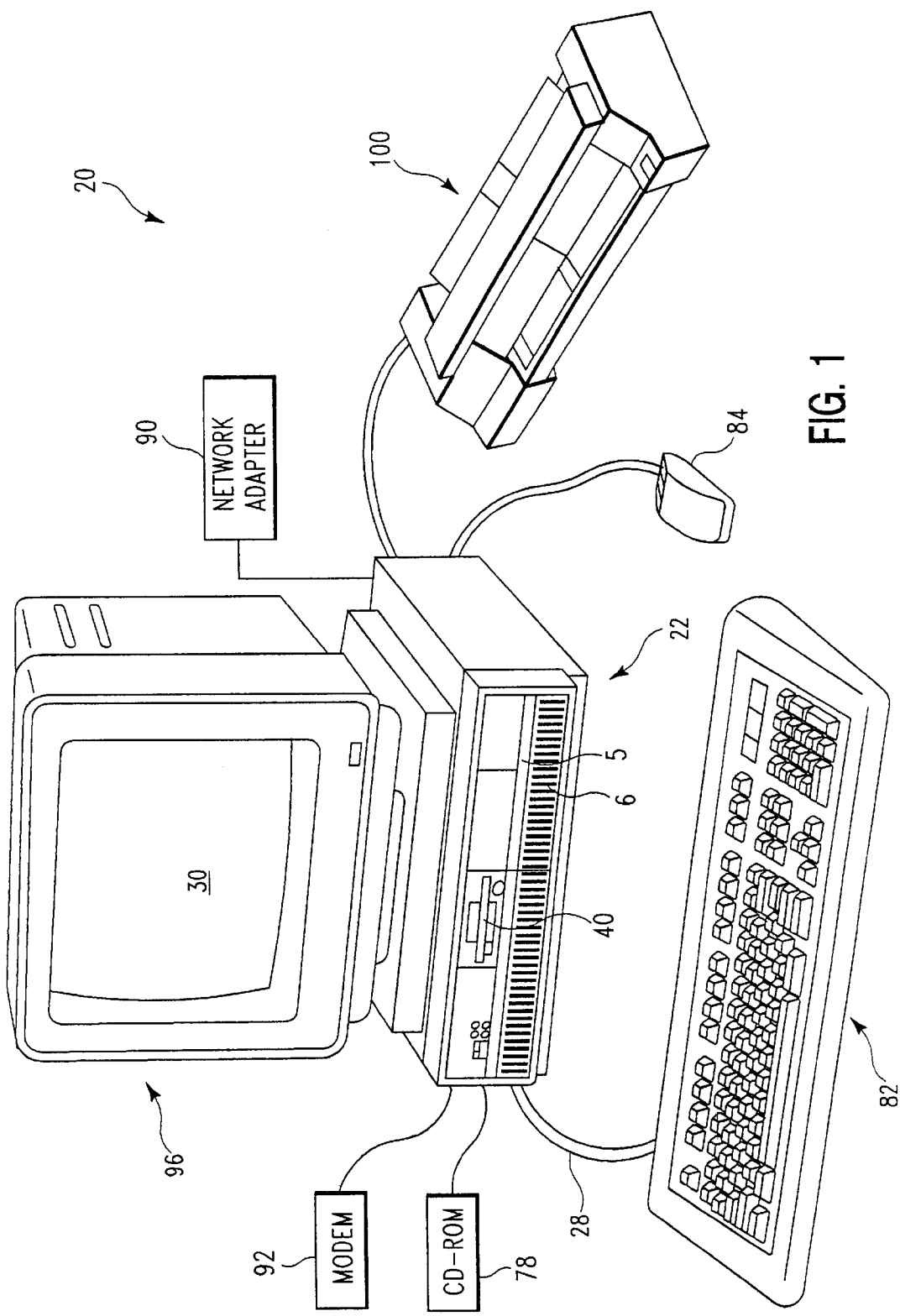
FIG. 1 is a diagram of a data processing system in which the present invention can be practiced.

FIG. 1 is a diagram of a data processing system 20 in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

Figure 2:
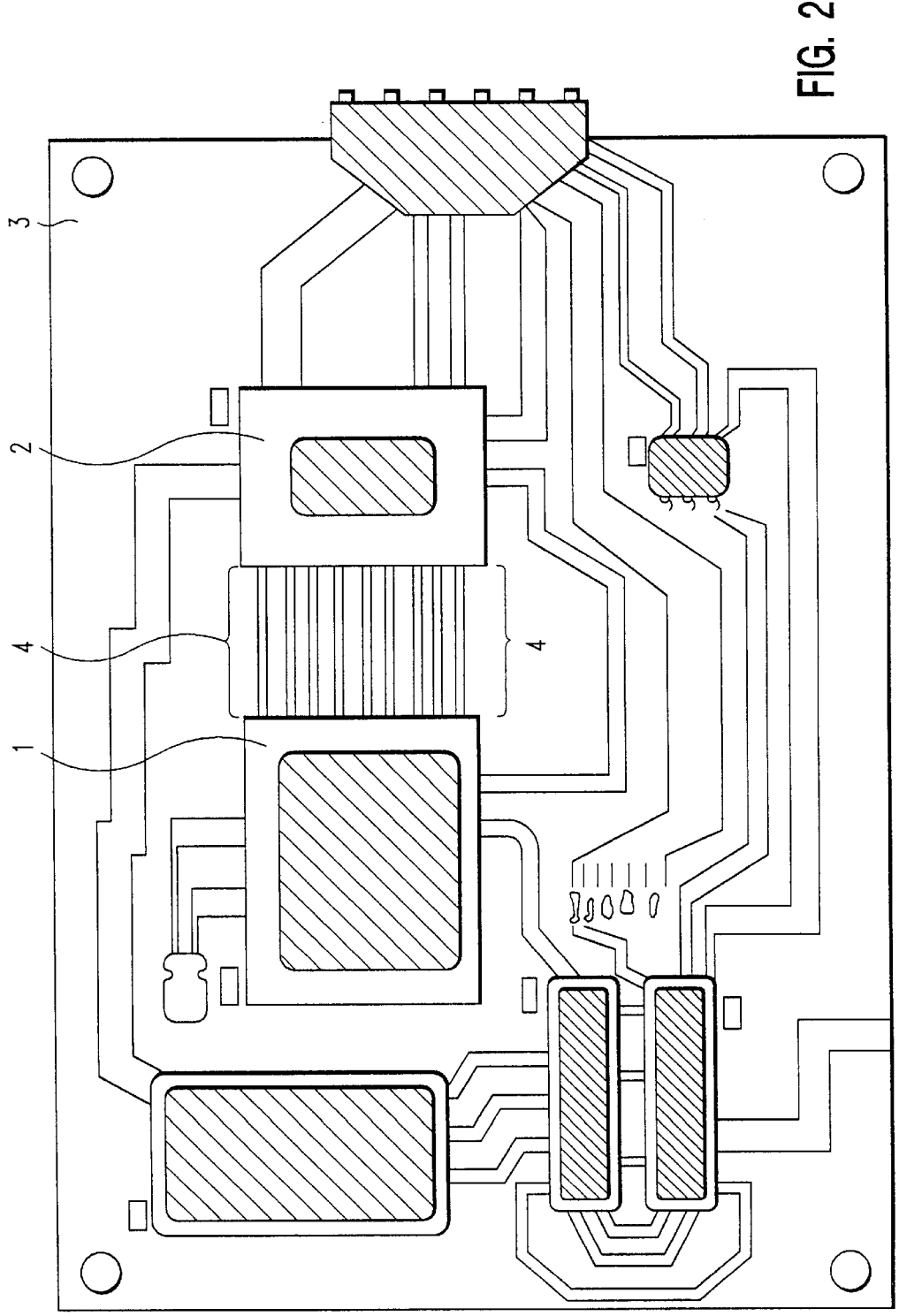
FIG. 2 is a diagram of a computer card that may reside in the processor of FIG. 1 according to the teachings of the present invention.

FIG. 2 is a diagram of a computer card (3) that may reside in the processor 22 of FIG. 1 according to the teachings of the present invention. Computer card (3) includes a Central Processing Unit (CPU) (1) and a memory chip (2). Communication between the CPU (1) and the memory chip (2) is accomplished using data bus wires (4).

The present invention provides a novel method and apparatus for using active CMOS device structures, or their equivalents, located on chip for providing termination of buses. In describing the present invention, the computer card (3) of FIG. 2 is used as a convenient and non-obfuscating example, and by no means is to be considered a limitation to the numerous applicability's to which the present invention can be used.

Figure 3:
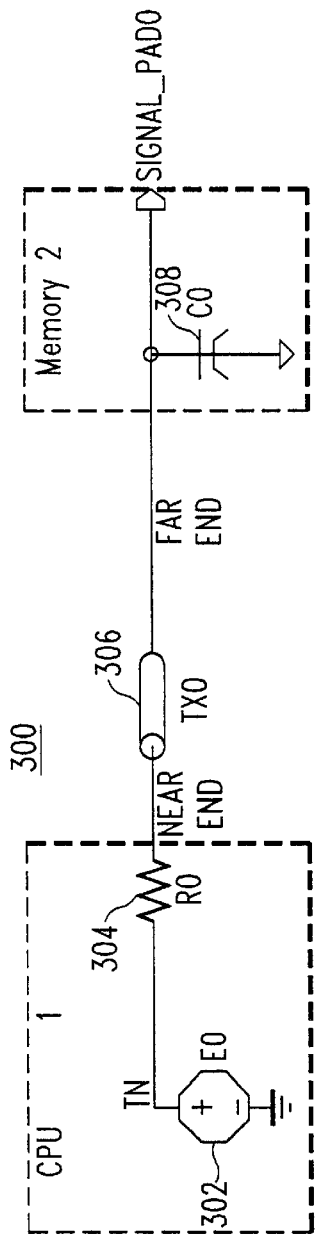
FIG. 3 is a schematic diagram illustrating an example of how a conventional unterminated point-to-point network configuration for communication between the CPU and memory of FIG. 2 can be implemented.

FIG. 3 is a schematic diagram illustrating an example of how a conventional unterminated point-to-point network configuration 300 for communication between the cpu (1) and memory (2) of FIG. 2 can be implemented. The network configuration 300 includes an ideal voltage source E0 302, an internal resistance of the ideal voltage source R0 (typically 50 Ohms), a TX0 306 lossy transmission line, and a capacitance load C0 308. The TX0 306 represents one of the card traces (4) connecting the cpu (1) to the memory (2) and is typically about 50 Ohms with a delay of 70 ps/cm and a length of 8 cm. C0 308 is typically about 5 Pico Farads (pf) and represents the capacitance load at the far end of TX0 306. The operation of the network configuration 300 is described below in connection with low and high frequency parameters.

During low frequency operation, E0 302 drives a single voltage level for a period of time sufficient so as to allow both the near end and the far end of the transmission line TX0 306 to settle to a predetermined DC voltage value (either positive or negative power supply level of the driver circuit) absent any DC current flow. This settling typically occurs after one round-trip delay along the signal connection for impedance-matched networks.

During high frequency operation, E0 302 switches its drive level before the entire (far and near ends) transmission line TX0 306 has settled to a predetermined DC Level. The premature switching results in a reduced amplitude signal swing and "history" effects (superimposed forward and backward traveling waves) which can cause signal distortion. While the reduced amplitude and signal distortion which occurs may be negligible during continuous switching, significant ringing occurs at the far end of the transmission line TX0 306 when the near-end driver goes into a high impedance state after switching (R0 304 of FIG. 3 becomes infinite).

Figure 4A:
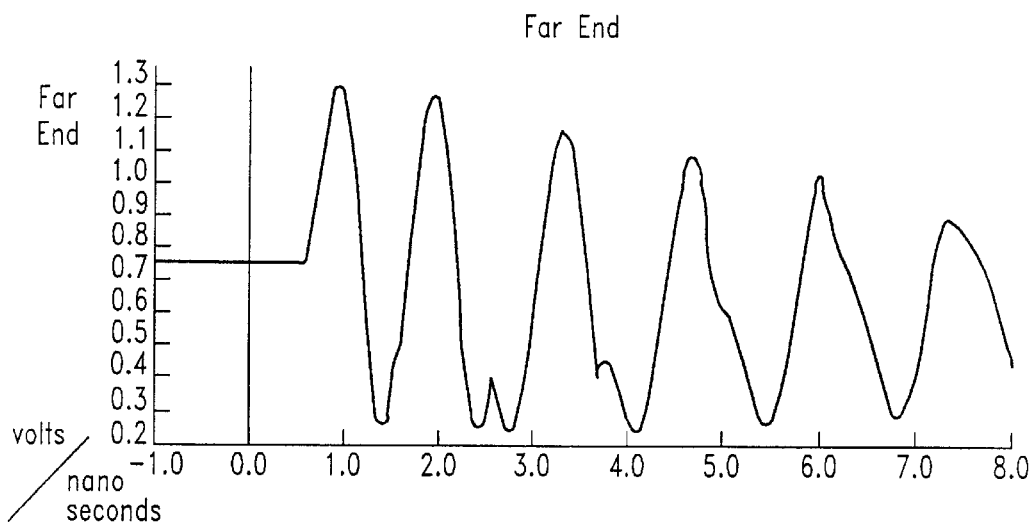
FIGS. 4A–B are simulations of how the distortions of the voltage wave form at both the far and near ends, respectively of the transmission line of FIG. 3 may appear during high frequency operation.
Figure 4B:
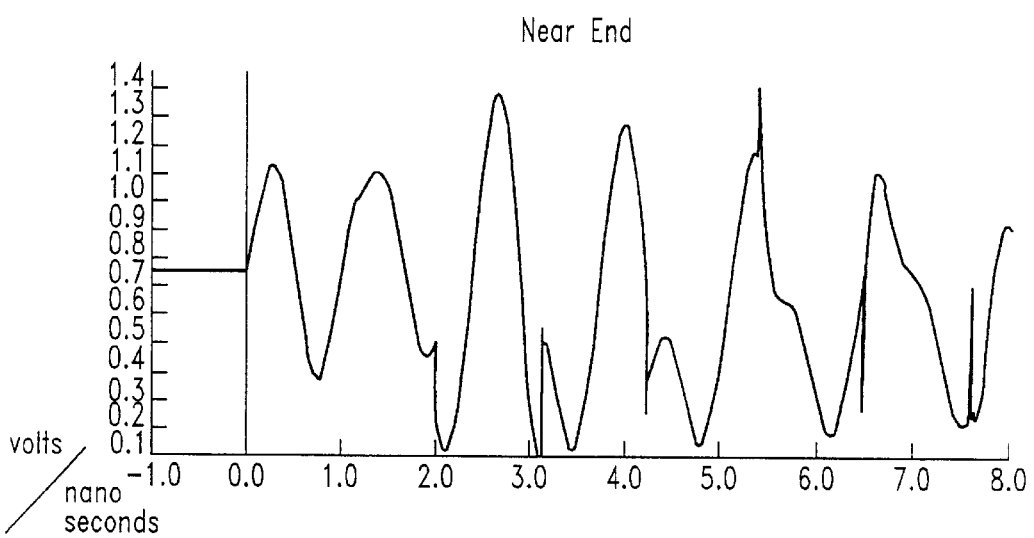

FIGS. 4A–B are simulations of how the distortions of the voltage wave form at both the far and near ends, respectively of the transmission line TX0 306 of FIG. 3 may appear during high frequency operation. The timing scale (x-axis) is nanoseconds, the voltage scale (y-axis) is volts. The illustrated wave form was produced by switching E0 302 as a one Giga Hertz sine wave for 2 Nano Seconds, and then causing R0 304 to increase by eight orders of magnitude, reproducing the effect of placing the driver in the high impedance mode. As illustrated, the transmission line TX0 306 fails to settle even after 6 Nano seconds of ringing. The amplitude of the ringing is sufficient to cause the receiver at the far end to switch and/or timing skews if the driver at the far end becomes active (e.g. a bi-directional signal network).

Another disadvantage of an unterminated point-to-point network is that the driving circuit at the near end must absorb energy reflected from the far end of the transmission line every time a signal is driven. This near end absorption can cause significant on-chip power supply noise if all ones or zeros are driven. This condition of driving all ones or all zeros is commonly referred to as "simultaneous switching." Simultaneous switching causes all of the absorbed energy to have a path to the same power supply. The noise generated during simultaneous switching results from the real world constraints of a non-ideal power connection to the driver circuit. Depending upon the particular implementation, the package connection between the driver source node and the stable card-level supply can have an inductance as little as a fraction of a Nano Henry or as much as several Nano Henries.

At very high frequencies, the absorption of these reflections and the resulting noise can be superimposed with the noise resulting from switching the drivers. The magnitude of the total resulting noise can exceed one Volt. This magnitude of noise poses a drastic performance limitation in systems which operate with power supplies of 1.5 Volts or less. This power supply noise will cause a quiet line to have an unacceptable transient voltage when all other signal lines are switched simultaneously (i.e. noise on the power supply is transmitted to the quiet line through the quiet line driver).

Termination techniques have been developed which eliminate the superposition of these two power supply noise sources by causing forward traveling waves to be completely absorbed at the far end of the transmission line via the termination. Thus, in an ideal environment, the near end of the transmission line will not absorb reflected energy.

Figure 5:
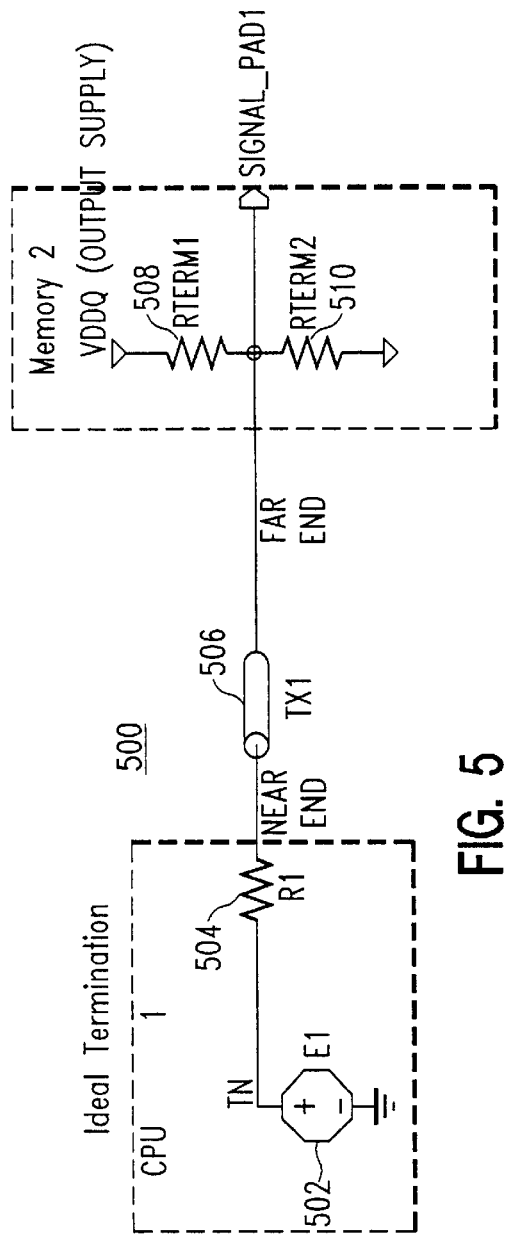
FIG. 5 is a schematic diagram illustrating an example of how an ideal terminated point-to-point network configuration for communication between the cpu and memory of FIG. 2 can be implemented.

FIG. 5 is a schematic diagram illustrating an example of how an ideal terminated point-to-point network configuration 500 for communication between the cpu (1) and memory (2) of FIG. 2 can be implemented. In similarity to the signal network 300 of FIG. 2, the network configuration 500 includes an ideal voltage source E1 502 for driving the network 500, a resistor R1 504 which represents the internal resistance of the voltage source E1 502 (typically 50 Ohms), and a TX1 506 lossy transmission line (typically 50 Ohms with a delay of 70 ps/cm and a length of 8 cm) which represents the card trace (4) connecting the cpu (1) to the memory (2). In addition, Rterm1 508 and Rterm2 510 represent ideal passive terminating resistors (each typically 100 Ohms). It should be noted that the signal network 500 represents the best possible network for signal integrity, since both the far-end capacitance and any inductance in the connection from the far end of the transmission line TX1 506 to the terminating resistors Rterm1 508 and Rterm 510 have been excluded.

In general, the far end of the terminated network 500 will have a DC voltage bias equal to the power source divided by two (Vdd/2). In addition, the far end of the terminated network will usually have a Thevinen resistance substantially equivalent to that of the TX1 506 transmission line.

Figure 6A:
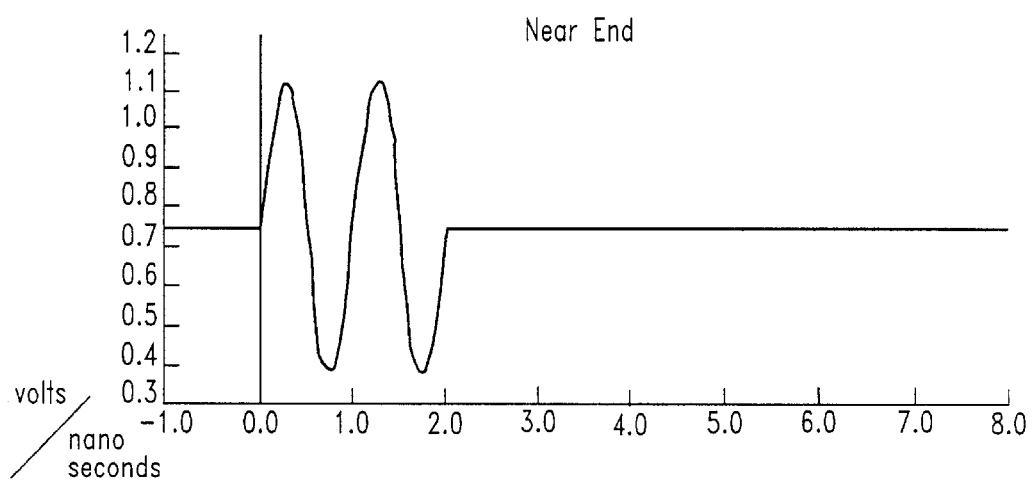
FIGS. 6A–B are simulations of the how the voltage wave form at both the near and far ends, respectively of the transmission line of FIG. 5 may appear during high frequency operation.
Figure 6B:
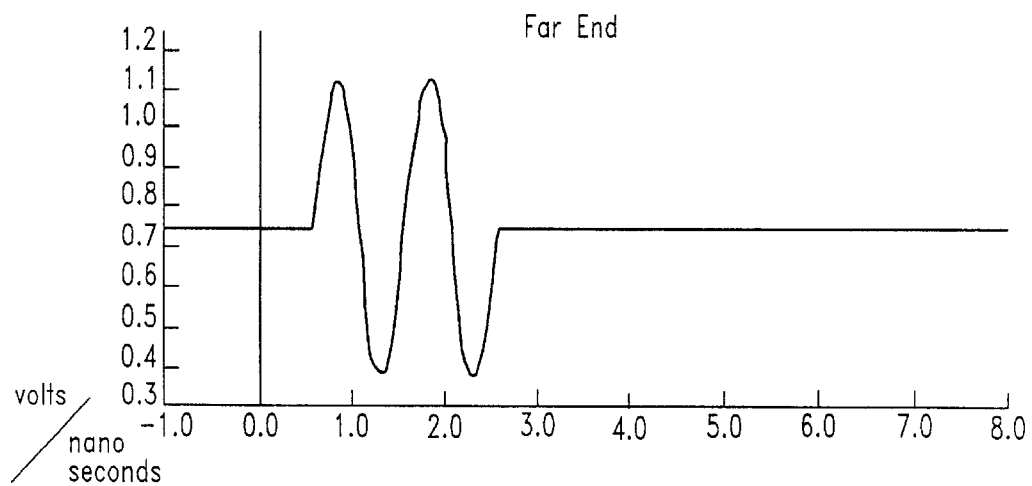

FIGS. 6A–B are simulations of the how the voltage wave form at both the near and far ends, respectively of the transmission line TX1 506 of FIG. 5 may appear during high frequency operation. The timing scale (x-axis) is nanoseconds, the voltage scale (y-axis) is volts. The illustrated wave form was produced by switching E1 502 as a one Giga Hertz sine wave for 2 Nano Seconds, and then causing R1 504 to increase by eight orders of magnitude, reproducing the effect of placing the driver in the high impedance mode. In contrast to the wave forms of FIGS. 4A–B, the wave forms of FIGS 6A–B settle almost immediately once the driver has been placed in the high impedance mode. As shown, the signal experiences no deformations, and the transmission line TX1 506 is able to reach a DC voltage level after only one propagation delay (half of the round-trip delay) along the signal trace (TX1 506). The most significant disadvantages of using a resistive termination such as that shown in FIG. 5 are: 1) reduced signal amplitude; 2) DC currents which remain even after the signal network has settled; 3) significant space requirement for placing on a computer card; and 4) the wire connection between the data bus and the termination resistor can be long enough to substantially reduce the effectiveness of the termination.

Figure 7:
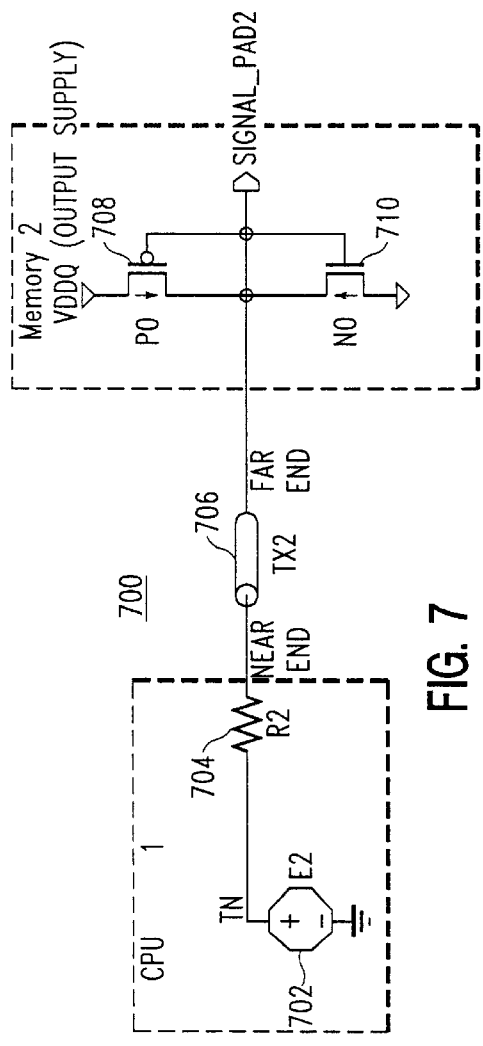
FIG. 7 is a circuit diagram of how an active terminated point-to-point network configuration for communication between the cpu and the memory of FIG. 2 can be implemented according to the teachings of the present invention.

FIG. 7 is a circuit diagram of how an active terminated point-to-point network configuration 700 for communication between the cpu (1) and the memory (2) of FIG. 2 can be implemented according to the teachings of the present invention. In similarity to the signal network 500 of FIG. 5, Network 700 includes an ideal voltage source E2 702 for driving the network 700, a resistor R2 704 which represents the internal resistance of the voltage source E2 702 (typically 50 Ohms), a TX2 706 lossy transmission line (typically 50 Ohms with a delay of 70 ps/cm and a length of 8 cm) which represents the card trace connecting the cpu (1) to the memory (2). In addition PFET P0 708 and NFET N0 710 are included to provide the active termination components. These active termination components 708 and 710 can be located on a cpu chip, memory chip, or any other high speed peripheral device. It should be noted that the design of network 700 has the added benefit of occupying a smaller area in immediate proximity to the on-chip far end terminal of the transmission line TX2 706.

In general, the active termination components 708 and 710 have desirable AC characteristics such as their self biasing CMOS structure (i.e. the "turn on" characteristics of one will compensate for the "turn off" characteristics of the other).

Figure 8A:
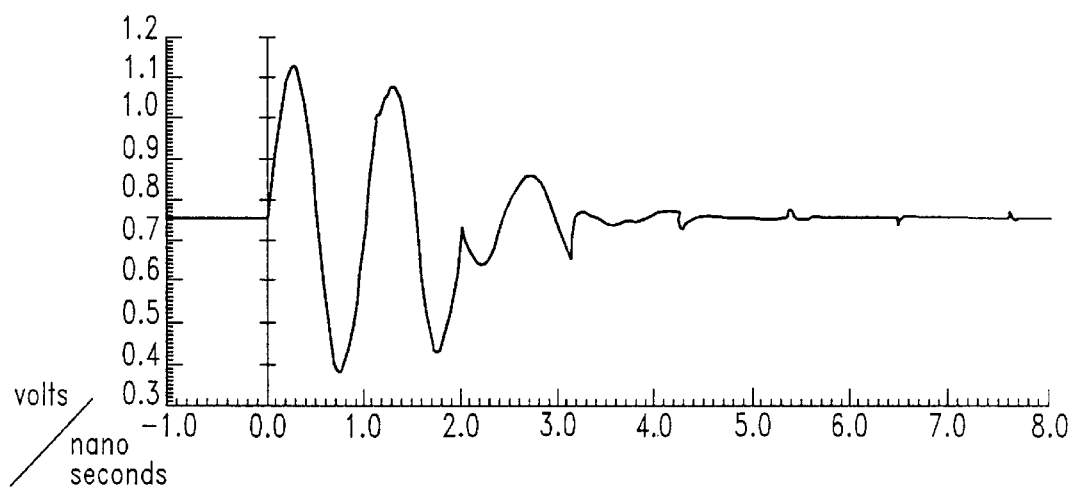
FIGS. 8A–B are simulations of the voltage wave form at both the near and far ends, respectively of the transmission line of FIG. 7 according to the teachings of the present invention.
Figure 8B:
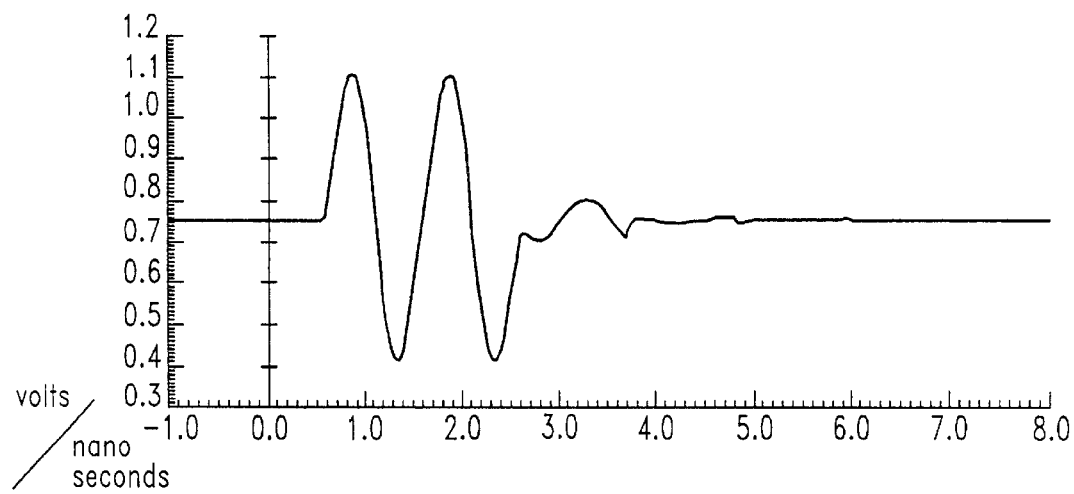

FIGS. 8A–B are simulations of the voltage wave form at both the near and far ends, respectively of the transmission line TX2 706 of FIG. 7 according to the teachings of the present invention. The timing scale (x-axis) is nanoseconds, the voltage scale (y-axis) is volts. The illustrated wave form was produced by switching E2 702 as a one Giga Hertz sine wave for 2 Nano Seconds, and then causing R2 704 to increase by eight orders of magnitude, reproducing the effect of placing the driver in the high impedance mode. Since the impedance matching of network 700 is not ideal, a small signal reflection (less than 50 milli Volts) occurs at the far end after the driver at the near end has gone into a high impedance mode. The DC biasing for the network 700 is correct for a parallel-terminated signal network (i.e. 0.75 V for a VDDQ output supply of 1.5V), and the network only requires approximately a single cycle (1 nano second) to settle completely.

Figure 9A:
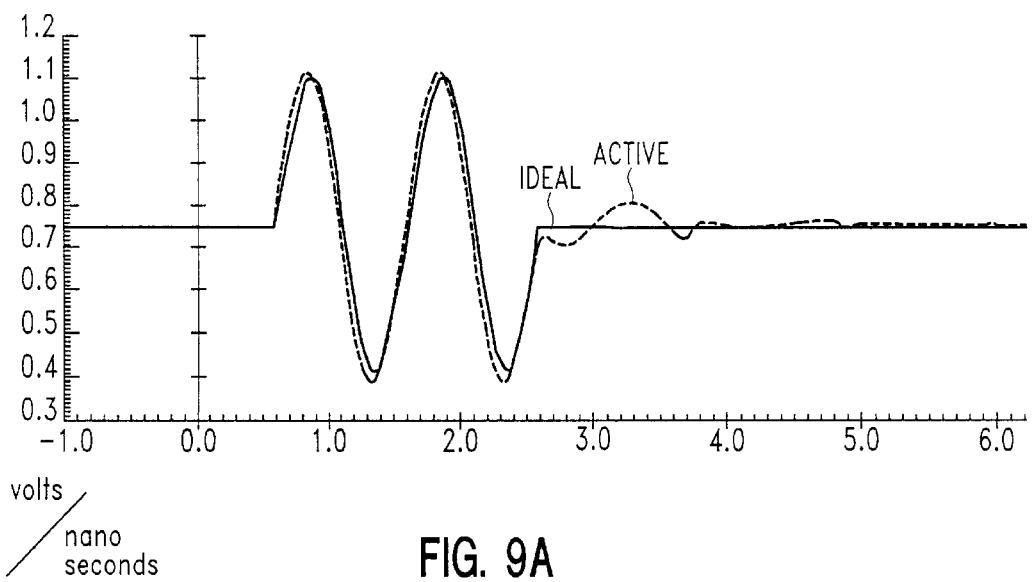
FIG. 9A is a timing diagram illustrating the voltage waveforms of FIGS. 6B (ideal termination) and 8B (active termination) superimposed for comparison upon one another according to the teachings of the present invention.

FIG. 9A is a timing diagram illustrating the voltage waveforms of FIGS. 6B (ideal termination) and 8B (active termination) superimposed for comparison upon one another according to the teachings of the present invention. As shown, the data signals of the active termination are nearly identical in amplitude and timing to the data signals of the ideal termination.

Figure 9B:
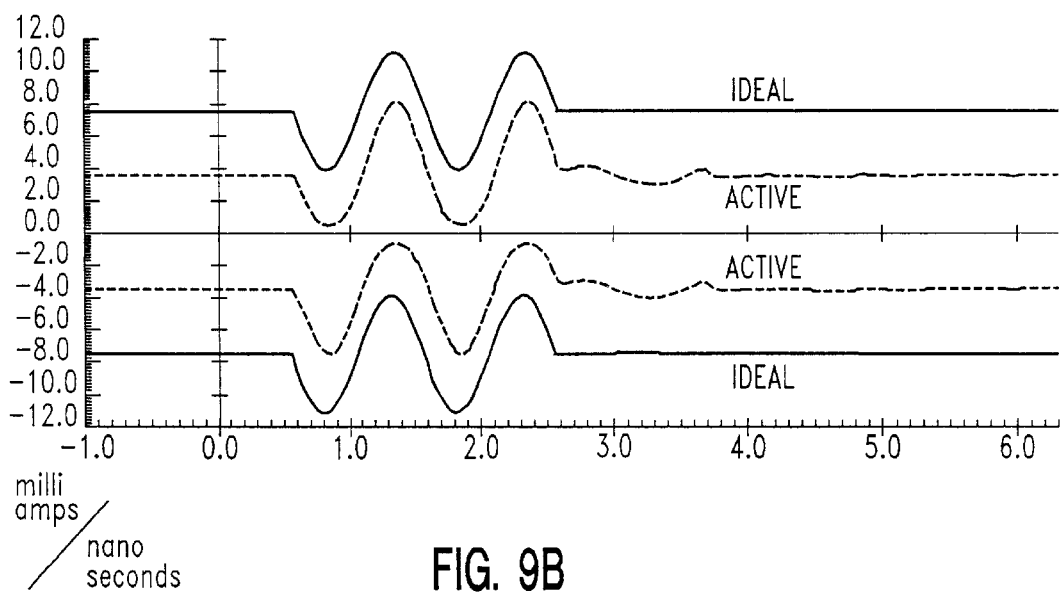
FIG. 9B is a timing diagram illustrating the current waveforms for both the active termination network of FIG. 7 and the ideal termination network of FIG. 5 superimposed upon one another in accordance with the teachings of the present invention.

FIG. 9B is a timing diagram illustrating the current waveforms for both the active termination network 700 of FIG. 7 and the ideal termination network 500 of FIG. 5 superimposed upon one another in accordance with the teachings of the present invention. As shown, the active termination network 700 of FIG. 7 consumes less DC power without compromising AC performance. More specifically, the ideal termination network 500 of FIG. 5 allows 7.54 milli Amps to flow from VDDQ to ground when the driver is in the high impedance state. In contrast, the active termination network 700 of FIG. 7 only allows 3.57 milli Amps to flow from VDDQ (output supply) to ground when the driver is in high impedance state. The active termination network 700 has a decreased power consumption of over 50 percent in comparison to the ideal network 500. The decreased power consumption is ideal for allowing on-chip termination without exceeding the thermal limitations of the chip's package.

Decreasing the power consumption without affecting the overall performance is made possible by DC biasing of the active devices (P0 708 and N0 710) such that their AC performance very nearly reproduces that of 100 Ohm passive resistors.

Figure 10:
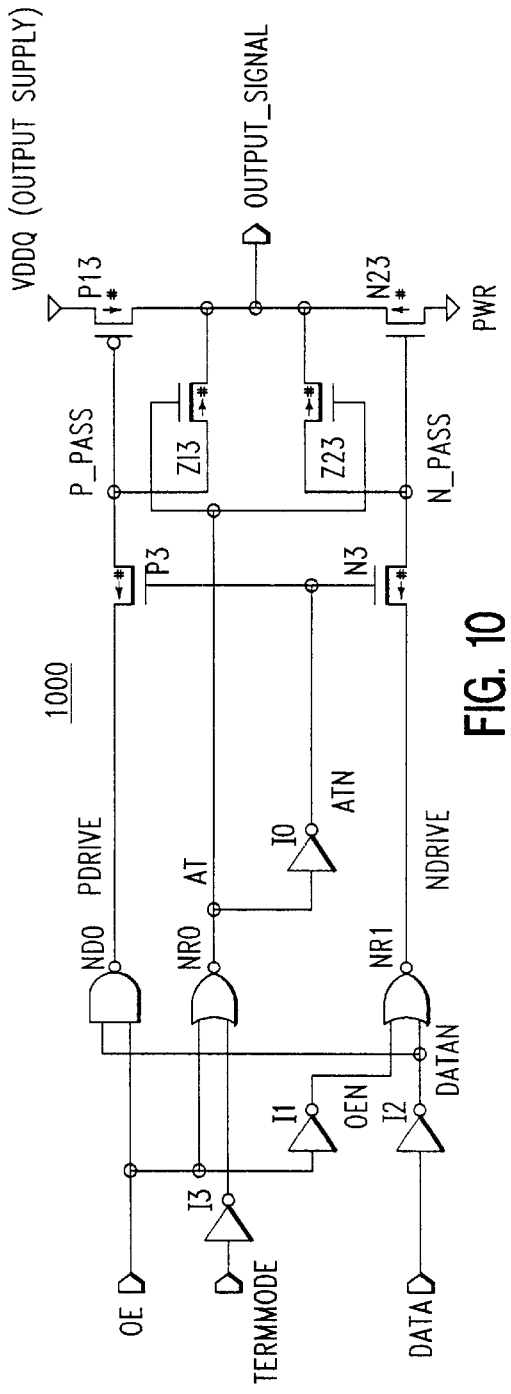
FIG. 10 is a circuit diagram of a preferred embodiment for active parallel termination (APT) that has been incorporated into an off-chip driver circuit according to the teachings of the present invention.

FIG. 10 is a circuit diagram of a preferred embodiment for active parallel termination (APT) that has been incorporated into an off-chip driver circuit 1000 according to the teachings of the present invention. Normally, an off-chip driver has three states, driving a low (ZERO)—P13 off, N23 on, driving a high (ONE)—P13 on, N23 off, and high impedance (HIZ)—P13 off, N23 off. Incorporating active parallel termination into an off-chip driver circuit introduces a fourth state—P13 partially on, N23 partially on. This new circuit structure is best referred to as a "quad-state buffer". Each of these four modes of operation are listed in Table 1 and described in more detail below.

TABLE 1

| OE | Data | TERMMODE | P_pass | N_pass | Output |
|----|------|----------|--------|--------|--------|
| 1  | 1    | X        | high   | high   | ZERO   |
| 1  | 0    | X        | low    | low    | ONE    |
| 0  | X    | 0        | high   | low    | HIZ    |
| 0  | X    | 1        | float  | float  | APT    | note: "X" = don't care

In the first mode (ZERO), OE and DATA are both high. OE high causes the output of NOR gate NR0, node AT, to be low and the output of inverter I0, node ATN, to be high. In this condition, zero-threshold NFET devices N3 and P3 are on and zero-threshold NFET devices Z13 and Z23 are off. Device N3 couples node N_PASS electrically to node NDRIVE, causing node N_PASS to have a voltage level very nearly equal to that of node NDRIVE as long as zero-threshold device Z23 remains off. Similarly, device P3 couples node P_PASS electrically to node PDRIVE, causing node P_PASS to have a voltage level very nearly equal to that of node PDRIVE as long as zero-threshold device Z13 remains off. The high state on DATA is inverted by inverter I2 which causes the output of NAND gate ND0 to be high. This high potential on node PDRIVE is driven through zero-threshold device P3 onto node P_PASS resulting in device P13 being off. The low on node DATAN and node OEN (OE inverted) causes the output of NOR gate NR1 to be high. This high potential on node NDRIVE is driven through zero-threshold device N3 onto node N_PASS which results in device N23 being on thus causing node OUTPUT_SIGNAL to be at a low state.

In the second mode (ONE), OE is high and DATA is low. OE high has the same affect as described above. DATA low causes the output of NOR gate NR1 to be low. This low potential on node NDRIVE is driven through zero-threshold device N3 onto node N_PASS which results in device N23 being off. Both OE and DATAN being high causes the output of NAND gate ND0 to be low. This low potential on node PDRIVE is driven through zero-threshold device P3 onto node P_PASS resulting in device P13 being on thus causing node OUTPUT_SIGNAL to be at a high state.

In the third mode (HIZ), OE is low and TERMMODE is low. TERMMODE low causes the output of NOR gate NR0 to be low and the output of inverter I0 to be high. In this condition, zero-threshold devices N3 and P3 are on and zero-threshold devices Z13 and Z23 are off. OE low causes the output of NAND gate ND0 to be high thus keeping device P13 off, and also causes the output of NOR gate NR1 to be low thus keeping device N23 off.

In the fourth mode (APT), OE is low and TERMMODE is high. This causes the output of NOR gate NR0 to be high which results in zero-threshold devices N3 and P3 being off and zero-threshold devices Z13 and Z23 being on. Device Z 13 couples node P_PASS electrically to node OUTPUT_SIGNAL, causing node P_PASS to have a voltage level very nearly equal to that of node OUTPUT_SIGNAL as long as zero-threshold device P3 remains off. Similarly, device Z23 couples node N_PASS electrically to node OUTPUT_SIGNAL, causing node N_PASS to have a voltage level very nearly equal to that of node OUTPUT_SIGNAL as long as zero-threshold device N3 remains off. With their gates essentially connected to their drains, devices P13 and N23 are only partially on (gate to source voltage of approximately VDD/2) compared to the ONE or ZERO mode of operation, where the on device has a gate to source voltage of VDD. To summarize, signal TERMMODE is used to alter the typical function of the output drivers output enable signal (OE). Instead of placing the driver into a high impedance state (HIZ), when the chip is transitioning from the drive mode to the receive mode, TERMMODE high will allow a low OE to partially keep both drive transistors on, thereby providing an active means of termination.

In order to better facilitate the performance of the active devices, their width must be adjusted to give the correct terminating resistance independent of variations in process, temperature, and power supply voltage. It would be further advantageous if the termination impedance was programmable (i.e. programmable termination device width to match a desired value).

Figure 11:
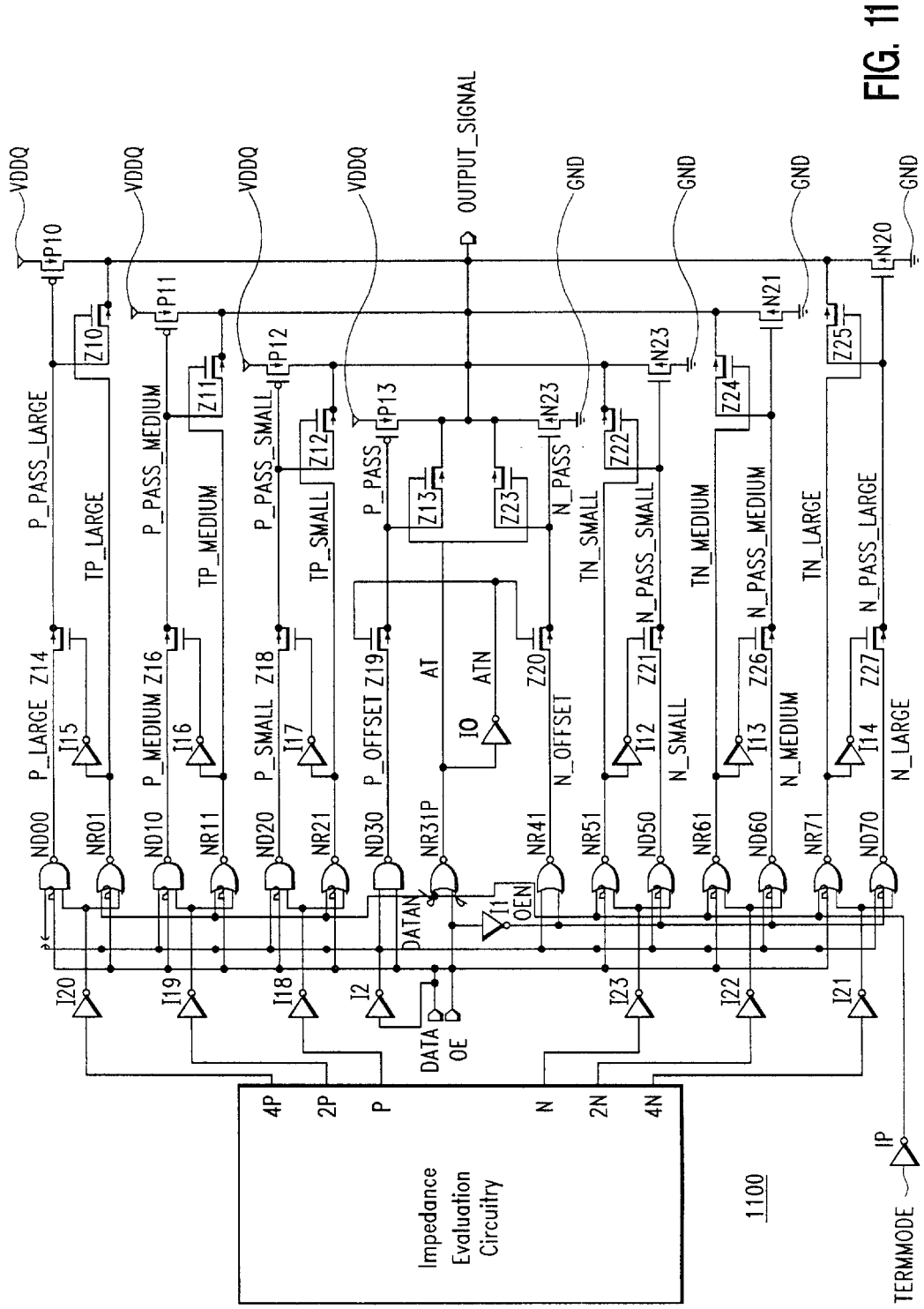
FIG. 11 is a circuit diagram of a programmable quad-state buffer constructed according to the teachings of the present invention.

FIG. 11 is a circuit diagram of a programmable quad-state buffer 1100 constructed according to the teachings of the present invention. Each of these four modes of operation are listed in Table 1 and described in more detail below.

In the first mode (ZERO), OE and DATA are both high. OE high causes the output of NOR gate NR31, node AT, to be low and the output of inverter I0, node ATN, to be high. In this condition, zero-threshold devices Z19 and Z20 are on and zero-threshold devices Z13 and Z23 are off. Device Z20 on couples node N_PASS electrically to node N_OFFFSET, causing node N_PASS to have a voltage level very nearly equal to that of node N_OFFSET as long as zero-threshold device Z23 remains off. Similarly, device Z19 couples node P_PASS electrically to node P_OFFSET, causing node P_PASS to have a voltage level very nearly equal to that of node P_OFFSET as long as zero-threshold device Z13 remains off. Node OE high also forces the outputs of NOR gates NRO1, NR11, NR21, NR31, NR41, NR51, NR61, and NR71 low, causing zero-threshold devices Z10, Z11, Z12, Z13, Z22, Z23, Z24, and Z25 to be off and zero-threshold devices Z14, Z16, Z18, Z21, Z26, and Z27 to be on. The high state on DATA is inverted by inverter I2, node DATAN, which causes the output of NAND gates ND00, ND10, ND20, and ND30 to be high which in turn causes PFETs P10 through P13 to be off. The low on node DATAN and node OEN (OE inverted) causes the output of NOR gate NR41 to be high. This high potential on node N_OFFSET is driven through zero-threshold device Z20 onto node N_PASS which results in device N23 being on. Some combination of nodes N_SMALL, N_MEDIUM, and N_LARGE may be high as well, corresponding to a combination of nodes N, 2N, and 4N being high. Which of nodes N, 2N, and 4N are high depends on the combination of devices N20 through N22 which, when turned on, results in an output impedance of the quad-state buffer 1100 that matches a desired output impedance. This desired output impedance is programmed through the impedance evaluation circuitry 1102. Nodes P, 2P, and 4P are don't cares (x) in this mode.

In the second mode (ONE), OE is high and DATA is low. OE high has the same affect as described above. DATA low causes the output of inverter I2, DATAN, to be high. This high potential on node DATAN causes the outputs of NOR gates NR41, NR51, NR61, and NR71 to be low thus placing NFETs Z22 through Z25 in an off state. OE high and node DATAN high also cause the output of NAND gate ND30, P_OFFSET, to be low. This low potential on node P_OFFSET is driven through zero-threshold device Z19 onto node P_PASS resulting in device P13 being on. Some combination of nodes P_SMALL, P_MEDIUM, and P_LARGE may be low as well, corresponding to a combination of nodes P, 2P and 4P being low. Which of nodes P, 2P, and 4P are low depends on the combination of devices P10 through P12 which, when turned on, results in an output impedance of the quad-state buffer that matches a desired output impedance. This desired output impedance is programmed through the impedance evaluation circuitry 1102. Nodes N, 2N, and 4N are don't cares (x) in this mode.

In the third mode (HIZ), OE is low, TERMMODE is low, and DATA is a don't care. TERMMODE low causes the output of NOR gate NR31 to be low and the output of inverter I0 to be high. In this condition, zero-threshold devices Z19 and Z20 are on and zero-threshold devices Z13 and Z23 are off. OE low causes the output of NAND gates ND00, ND10, ND20, and ND30 to be high thus causing devices P10 through P13 to be off. The low state of OE is also inverted by inverter I1 causing the output of NOR gates NR41, NR50, NR60 and NR70 to be low thus placing devices N20 through N23 in an off state.

In the fourth mode (APT), OE is low and TERMMODE is high. This causes the output of NOR gate NR31 to be high which results in zero-threshold devices Z19 and Z20 being off and zero-threshold devices Z13 and Z23 being on. Device Z13 couples node P_PASS electrically to node OUTPUT_SIGNAL, causing node P_PASS to have a voltage level very nearly equal to that of node OUTPUT_SIGNAL as long as zero-threshold device Z19 remains off. Similarly, device Z23 couples node N_PASS electrically to node OUTPUT_SIGNAL, causing node N_PASS to have a voltage level very nearly equal to that of node OUTPUT_SIGNAL as long as zero-threshold device Z20 remains off. In a similar fashion, OE low and TERMMODE high will couple the drains and gates together of the remaining programmable output devices (P10,11,12,N20,21,22), depending on whether the respective programmable inputs (P,2P,4P,N,2N,4N) are active. For example, if 2P is active and 4P is inactive during the termination mode, then the output of nor gate NR11 will be high, coupling the gate of P11 to the output signal and thereby allowing P11 to contribute to the termination; nor gate NRO1 will provide a low on node TP_Large, preventing device P10 from providing current for the termination. This allows the termination to be precisely controlled by either the impedance evaluation circuitry, or possibly by direct user control (test circuit inputs for example, not shown here but common in the art).

It should be apparent to those of ordinary skill in the relevant art that the concepts behind the present invention can be extended to provide different values of termination by simply activating various combinations of the programmable impedance inputs. Further, by simply providing different termination enable signals for the pull-up and pull-down devices, the type of termination provided can be altered from the common mid-level termination scheme (discussed above) to either a simple pull-up or pull-down termination scheme.

Figure 12:
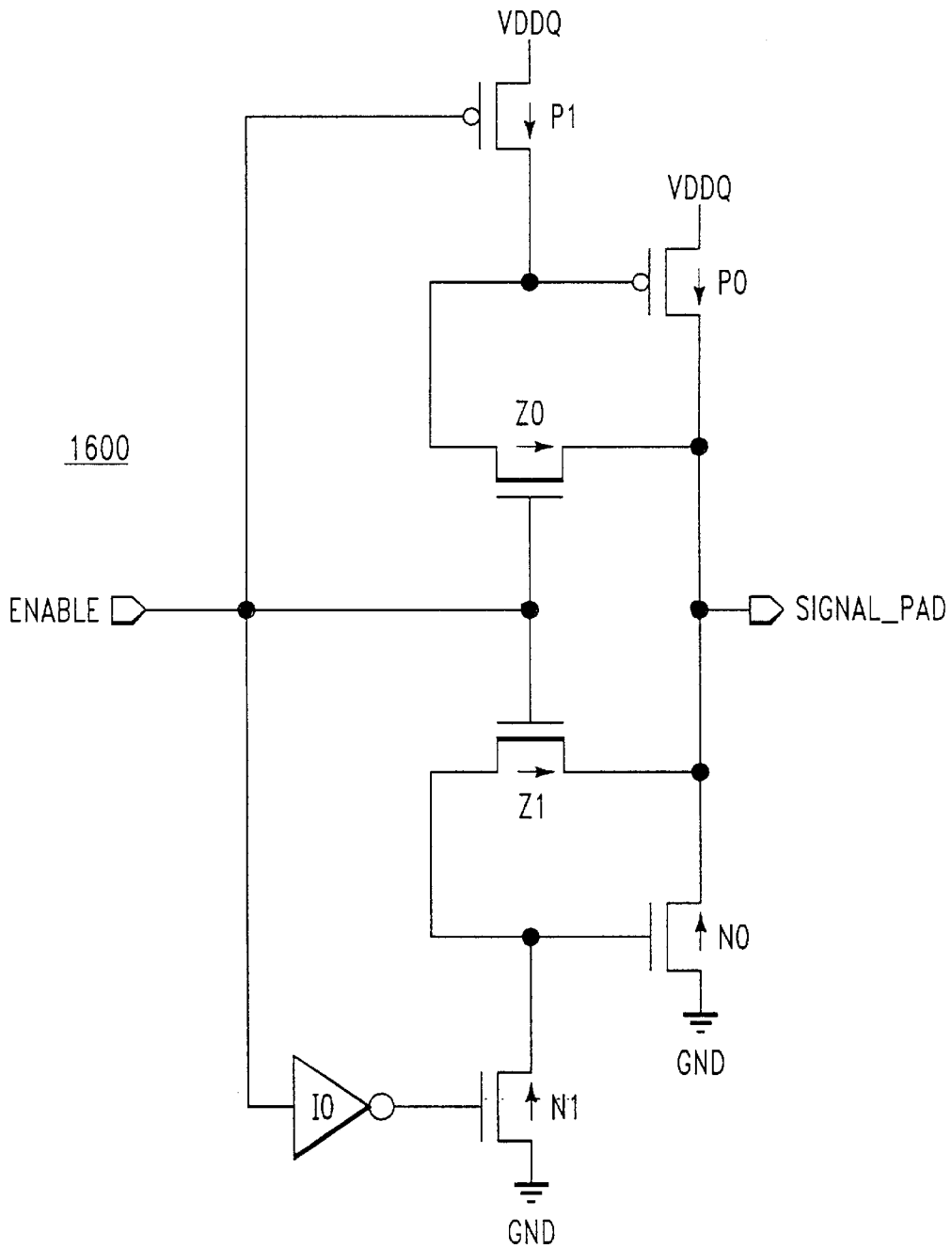
FIG. 12 is a circuit diagram of a active terminator that can be used in uni-directional networks according to a preferred embodiment of the present invention.

FIG. 12 is a circuit diagram of a active terminator 1600 that can be used in uni-directional networks according to a preferred embodiment of the present invention. The active terminator 1600 includes NFETs N0–N1, PFETs P0–P1, zero-threshold NFETs Z0–Z1, and inverter I0. When node Enable is high, NFETs Z0–Z1 are active and PFET P1 and NFET N1 are off. This results in the shorting of the gates of PFET P0 and NFET N0 to their common drains, thus forming a structure electrically equivalent to the active termination network 700 of FIG. 7. When node Enable is low, PFET P1 and NFET N1 are active while devices NFETs Z0–Z1 are off, causing the active terminator 1600 to be in a high impedance state. Obviously, the active terminator 1600 could be modified in manner similar to that illustrated in FIG. 11 in order to be programmable (i.e. feedback controlled).

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. An active termination circuit comprising:
   a first transistor of a first type;
   a first predrive circuit for driving a logical value to the first transistor;
   a first isolation device, coupled to the first predrive circuit and the gate of the first transistor, for isolating the first transistor from the first predrive circuit during active termination;
   a second transistor of a type complementary to the first type;
   a second predrive circuit for driving a logical value to the second transistor;
   a second isolation device, coupled to the second predrive circuit and the gate of the second transistor, for isolating the second transistor from the second predrive circuit during active termination;
   a communication line for receiving and transmitting signals, the communication line being coupled to the drain of each of the first and second transistors; and
   a circuit for selectively coupling the gates of the first and second transistors to their respective drains during active termination.

2. The active termination circuit of claim 1 wherein the first and second isolation devices are zero threshold devices.

* * * * *